(12) United States Patent
Zhang et al.

(10) Patent No.: US 10,110,966 B2
(45) Date of Patent: Oct. 23, 2018

(54) METHOD, DEVICE, SERVER AND CLIENT DEVICE FOR VIDEO PROCESSING

(71) Applicants: Shell Internet (Beijing) Security Technology Co., LTD., Beijing (CN); Beijing Kingsoft Network Technology Co., LTD., Beijing (CN); Beijing Kingsoft Internet Security Software Co., LTD., Beijing (CN); Zhuhai Juntian Electronic Technology Co., LTD., Guangdong (CN); Conew Network Technology (Beijing) Co., LTD., Beijing (CN)

(72) Inventors: Kaihong Zhang, Beijing (CN); Zhen Wan, Beijing (CN); Sheng Fu, Beijing (CN)

(73) Assignees: SHELL INTERNET (BEIJING) SECURITY TECHNOLOGY CO., LTD., Beijing (CN); BEIJING KINGSOFT INTERNET NETWORK TECHNOLOGY CO., LTD., Beijing (CN); BEIJING KINGSOFT INTERNET SECURITY SOFTWARE CO., LTD., Beijing (CN); ZHUHAI JUNTIAN ELECTRONIC TECHNOLOGY CO., LTD., Zhuhai, Guangdong (CN); CONEW NETWORK TECHNOLOGY (BEIJING) CO., LTD., Beijing (CN)

( * ) Notice: Subject to any disclaimer, the term of this patent is extended or adjusted under 35 U.S.C. 154(b) by 8 days.

(21) Appl. No.: 14/904,606

(22) PCT Filed: Jul. 14, 2014

(86) PCT No.: PCT/CN2014/082177
§ 371 (c)(1),
(2) Date: Jan. 12, 2016

(87) PCT Pub. No.: WO2015/003663
PCT Pub. Date: Jan. 15, 2015

(65) Prior Publication Data
US 2016/0173953 A1   Jun. 16, 2016

(30) Foreign Application Priority Data

Jul. 12, 2013   (CN) .......................... 2013 1 0294120

(51) Int. Cl.
*H04N 21/61* (2011.01)
*H04N 21/81* (2011.01)
(Continued)

(52) U.S. Cl.
CPC ..... *H04N 21/6125* (2013.01); *H04N 21/4312* (2013.01); *H04N 21/472* (2013.01); *H04N 21/8173* (2013.01); *H04N 21/8586* (2013.01)

(58) Field of Classification Search
CPC .......... H04N 21/6125; H04N 21/8586; H04N 21/8173; H04N 21/472; H04N 21/8543;
(Continued)

(56) References Cited

U.S. PATENT DOCUMENTS

| 7,085,736 B2 * | 8/2006 | Keezer ............... G06Q 30/0641 705/27.1 |
| 2009/0327233 A1 * | 12/2009 | Wang ................ G06F 17/30887 |
| 2015/0143215 A1 | 5/2015 | Hu et al. |

FOREIGN PATENT DOCUMENTS

| CN | 101150803 A | 3/2008 |
| CN | 102510536 A | 6/2012 |

(Continued)

OTHER PUBLICATIONS

International Search Report dated Sep. 15, 2014 for corresponding International Application No. PCT/CN2014/082177, filed Jul. 14, 2014.
(Continued)

*Primary Examiner* — Benjamin R Bruckart
*Assistant Examiner* — Tien M Nguyen
(74) *Attorney, Agent, or Firm* — David D. Brush; Westman, Champlin & Koehler, P.A.

(57) ABSTRACT

Provided are a method, a device, a server, and a client device for video processing. The method includes: obtaining,
(Continued)

--- a page source code of a first video page and a video processing rule corresponding to the first video page are obtained according to a page address of the first video page, in which the first video page is corresponding to a first video /21 video playing information of the first video is obtained from the page source code according to the page source code of the first video page and the video processing rule /22 according to the page address of a first video page, page source code of the first video page and video processing rules corresponding to the first video page, the first video page corresponding to the first video; obtaining from the page source code, according to the page source code of the first video page and the video processing rules corresponding to the first video page, video playback information of the first video. The method obtains, by using preset video processing rules, video playback information from a video playback page and associated with a video. Further, video can be played directly without entering a video playback page.

10 Claims, 3 Drawing Sheets

(51) Int. Cl.
  *H04N 21/858* (2011.01)
  *H04N 21/431* (2011.01)
  *H04N 21/472* (2011.01)

(58) Field of Classification Search
  CPC ........... G06F 17/30905; H04L 67/2828; H04L 67/02; H04L 67/04
  See application file for complete search history.

(56) References Cited

FOREIGN PATENT DOCUMENTS

| | | |
|---|---|---|
| CN | 102857794 A | 1/2013 |
| CN | 102946343 A | 2/2013 |

OTHER PUBLICATIONS

English translation of the International Written Opinion dated Sep. 15, 2014 for corresponding International Application No. PCT/CN2014/082177, filed Jul. 14, 2014.

* cited by examiner

METHOD, DEVICE, SERVER AND CLIENT DEVICE FOR VIDEO PROCESSING

CROSS-REFERENCE TO RELATED APPLICATION

The present application is a Section 371 U.S. national phase application of International Application No. PCT/CN2014/082177, filed with the State Intellectual Property Office of P. R. China on Jul. 14, 2014, which is based upon and claims priority to Chinese Patent Application No. 201310294120.2, filed on Jul. 12, 2013, the entire contents of which are incorporated herein by reference.

FIELD

Embodiments of the present invention generally relate to an Internet technology field, and more particularly, to a video processing method, a video processing apparatus, a server and a client device.

BACKGROUND

In the related art, when a user intends to watch a video via a webpage opened in a browser, he usually makes a search in a search toolbar to obtain a search result, and clicks a video link in the search result to enter a video playing page, or enters the video playing page by directly inputting a link address of the video playing page in an address bar. In order to avoid searching or inputting the link address of the video playing page every time when the user watches the video, some users usually collect the video page that they are interested in. Therefore, when the user wants to watch the video, he just needs to find a corresponding link address in his favorites and clicks the corresponding link address to enter the video playing page.

No matter which above manner is used by the user to watch the video, he generally needs to enter the video playing page first, which results in following two problems: first, every time when the user watches the video, it needs to upload and enter a corresponding video playing page, which is inconvenient; second, besides the video, the video playing page opened by the user includes some content (such as advertisements) irrelevant with the video, and the content irrelevant with the video may bother the user who only intends to watch the video, thus depressing a user experience.

SUMMARY

Embodiments of the present disclosure provide a video processing method, including:
obtaining a page source code of a first video page and a video processing rule corresponding to the first video page according to a page address of the first video page, the first video page being corresponding to a first video;
obtaining video playing information of the first video from the page source code according to the page source code of the first video page and the video processing rule.

In the above video processing method, before obtaining a page source code of a first video page and a video processing rule corresponding to the first video page according to a page address of the first video page, the method further includes:
receiving a first operation instruction on the first video page from a client device, the first operation instruction carrying the page address of the first video page;
obtaining video playing information of the first video from the page source code according to the page source code of the first video page and the video processing rule includes:
obtaining the page source code of the first video page and the video processing rule corresponding to the first video page according to the page address of the first video page carried by the first operation instruction;
after obtaining the video playing information of the first video form the page source code, the method further includes:
returning the video playing information of the first video to the client device, such that the client device displays the video playing information of the first video to a user, and the user can play the first video according to the video playing information without opening the first video page.

In the above video processing method, before returning the video playing information of the first video to the client device, the method further includes:
receiving a request of obtaining the video playing information from the client device;
returning the video playing information of the first video to the client device includes:
returning a response message to the client device according to the request of obtaining the video playing information, the response message carrying the video playing information of the first video.

The above video processing video further includes:
matching the page address with domain names in a pre-stored video page list to obtain a matching result;
obtaining the page source code of the first video page and the video processing rule corresponding to the first video page according to the page address of the first video page, if the matching result indicates that the page address is matched with at least one domain name in the video page list.

In the above video processing method, the video processing rule is represented by a regular expression;
obtaining video playing information of the first video from the page source code according to the page source code of the first video page and the video processing rule includes:
searching for a source code matched with the regular expression from the page source code according to the regular expression representing the video processing rule, so as to obtain the video playing information of the first video.

In the above video processing method, the regular expression is corresponding to the domain name;
obtaining the video processing rule corresponding to the first video page according to the page address of the first vide page includes:
determining a domain name corresponding to the first video page according to the page address of the first video page;
querying a preset video processing rule according to the domain name corresponding to the first video page, so as to obtain the regular expression corresponding to the domain name.

In the above video processing method, the video playing information includes at least one of a video playing address, a video title and a video thumbnail.

In order to achieve above objectives, embodiments of the present disclosure provide a video processing method, including:
receiving a first operation order on a first video page from a user, the first video page being corresponding to a first video;

obtaining video playing information of the first video page according to the first operation order;

displaying the video playing information to the user, such that the user can play the first video according to the video playing information without opening the first video page.

In the above video processing method, obtaining video playing information of the first video page according to the first operation order includes:

determining a page address of the first video page according to the first operation order;

obtaining a page source code of the first video page and a video processing rule corresponding to the first video page according to the page address of the first video page;

obtaining the video playing information of the first video page from the page source code according to the page source code of the first video page and the video processing rule;

or, obtaining video playing information of the first video page according to the first operation order includes:

sending a first operation instruction on the first video page to a server according to the first operation order, the first operation instruction carrying the page address of the first video page, such that the server obtains the page source code of the first video page and the video processing rule corresponding to the first video page according to the page address, and obtains the video playing information of the first video page from the page source code according to the page source code of the first video page and the video processing rule;

receiving the video playing information of the first video page returned by the server.

In the above video processing method, before receiving the video playing information of the first video page returned by the server, the method further includes:

providing a first interface, the first interface including a page address region and a preview region, a page list being displayed in the page address region, identification information of the first video page being displayed in the page list, and the identification information including a title and/or the page address of the first video page;

receiving a second operation order on the identification information of the first video page from the user;

sending a request of obtaining the video playing information to the server according to the second operation order;

receiving the video playing information of the first video page returned by the server includes:

receiving a response message returned by the server according to the request of obtaining the video playing information, the response message including the video playing information of the first video page;

displaying the video playing information to the user includes:

displaying the video playing information in the preview region.

In the above video processing method, the video playing information includes at least a video playing address and a video thumbnail;

after displaying the video playing information in the preview region, the method further includes:

playing the first video according to the video playing address if it is detected that the user clicks the video thumbnail or the video playing address in the preview region.

In the above video processing method, playing the first video includes:

displaying a playing window as a floating layer above the first interface and playing the first video via the playing window.

In the above video processing method, a non-transparent or semitransparent shielding layer is disposed around the playing window so as to shield a part of the first interface which is not shielded by the playing window.

In order to achieve above objectives, embodiments of the present disclosure provide a video processing apparatus, including:

a first obtaining module, configured to obtain a page source code of a first video page and a video processing rule corresponding to the first video page according to a page address of the first video page, the first video page being corresponding to a first video;

a second obtaining module, configured to obtain video playing information of the first video from the page source code according to the page source code of the first video page and the video processing rule.

The above video processing apparatus further includes:

a first receiving module, configured to receive a first operation instruction of the first video page from a client device, the first operation instruction carrying the page address of the first video page; and a first sending module, configured to return the video playing information of the first video to the client device, such that the client device displays the video playing information of the first video to a user, and the user can play the first video according to the video playing information without opening the first video page, in which the first obtaining module is configured to:

obtain the page source code of the first video page and the video processing rule corresponding to the first video page according to the page address of the first video page carried by the first operation instruction.

The above video processing apparatus further includes:

a second receiving module, configured to receive a request of obtaining the video playing information from the client device;

in which, the first sending module is configured to:

return a response message to the client device according to the request of obtaining the video playing information, the response message carrying the video playing information of the first video.

The above video processing apparatus further includes:

a matching module, configured to match the page address with domain names in a pre-stored video page list to obtain a matching result;

in which the first obtaining module is configured to obtain the page source code of the first video page and the video processing rule corresponding to the first video page according to the page address of the first video page, if the matching result indicates that the page address is matched with at least one domain name in the video page list.

In the above video processing apparatus, the video processing rule is represented by a regular expression;

the second obtaining module is configured to:

search for a source code matched with the regular expression from the page source code according to the regular expression representing the video processing rule, so as to obtain the video playing information of the first video.

In the above video processing apparatus, the regular expression is corresponding to the domain name;

the first obtaining module includes:

a determining sub-module, configured to determine a domain name corresponding to the first video page according to the page address of the first video page;

an obtaining sub-module, configured to query a preset video processing rule according to the domain name corresponding to the first video page, so as to obtain the regular expression corresponding to the domain name.

In the above video processing apparatus, the video playing information includes at least one of a video playing address, a video title and a video thumbnail.

In order to achieve above objectives of the present disclosure, embodiments of the present disclosure provide a video processing apparatus, including:

a third receiving module, configured to receive a first operation order on a first video page from a user, the first video page being corresponding to a first video;

a third obtaining module, configured to obtain video playing information of the first video page according to the first operation order;

a displaying module, configured to display the video playing information to the user, such that the user can play the first video according to the video playing information without opening the first video page.

In the above video processing apparatus, the third obtaining module includes:

an operation instruction sending sub-module, configured to send a first operation instruction on the first video page to a server according to the first operation order, the first operation instruction carrying the page address of the first video page, such that the server obtains a page source code of the first video page and a video processing rule corresponding to the first video page according to the page address, and obtains the video playing information of the first video page from the page source code according to the page source code of the first video page and the video processing rule;

a video playing information receiving sub-module, configured to receive the video playing information of the first video page returned by the server;

or, the third obtaining module includes:

a page address determining sub-module, configured to determine a page address of the first video page according to the first operation order;

a rule obtaining sub-module, configured to obtain the page source code of the first video page and the video processing rule corresponding to the first video page according to the page address of the first video page;

an information obtaining sub-module, configured to obtain the video playing information of the first video page from the page source code according to the page source code of the first video page and the video processing rule.

The above video processing apparatus further includes:

an interface providing module, configured to provide a first interface, the first interface including a page address region and a preview region, a page list being displayed in the page address region, identification information of the first video page being displayed in the page list, and the identification information including a title and/or the page address of the first video page;

a fourth receiving module, configured to receive a second operation order on the identification information of the first video page from the user;

a second sending module, configured to send a request of obtaining the video playing information to the server according to the second operation order;

in which, the video playing information receiving sub-module is configured to:

receive a response message returned by the server according to the request of obtaining the video playing information, the response message including the video playing information of the first video page;

in which, the displaying module is configured to:

display the video playing information in the preview region.

In the above video processing apparatus, the video playing information comprises at least a video playing address and a video thumbnail;

the apparatus further includes:

a video playing module, configured to play the first video according to the video playing address if it is detected that the user clicks the video thumbnail or the video playing address in the preview region.

In the above video processing apparatus, the video playing module is configured to:

display a playing window as a floating layer above the first interface and play the first video via the playing window.

In the above video processing apparatus, a non-transparent or semitransparent shielding layer is disposed around the playing window so as to shield a part of the first interface which is not shielded by the playing window.

In order to achieve objectives, embodiments of the present disclosure provide a server, including a video processing apparatus according to above embodiments of the present disclosure.

In order to achieve objectives, embodiments of the present disclosure provide a client device, including a video processing apparatus according to above embodiments of the present disclosure.

In order to achieve objectives, embodiments of the present disclosure provide a browser device, including a video processing apparatus according to above embodiments of the present disclosure.

In order to achieve objectives, embodiments of the present disclosure provide a readable storage medium having stored therein computer programs that, when executed, are configured to perform a video processing method according above embodiments of the present disclosure. Embodiments of the present disclosure have at least one of following significant effects.

In embodiments of the present disclosure, the video processing rule is set and the video playing information of the video in the video page can be obtained directly via the video processing rule.

In embodiments of the present disclosure, the user can play the corresponding video directly according to the video playing information without entering into the video playing page.

In embodiments of the present disclosure, the content (such as advertisements) irrelevant with the video in the video playing interface also can be avoided, thus improving a visual effect and a user experience.

In embodiments of the present disclosure, when the video is played directly, a floating layer is presented above the original page to play the video, and the content of the original page in the browser is shielded by the non-transparent or semitransparent shielding layer, such that attention of the user can be drawn to the video, thus further improving the user experience.

DETAILED DESCRIPTION

In order to make technical problems to be solved by embodiments of the present disclosure, technical solutions and advantages thereof more transparent, the present disclosure will be described in the following with reference to drawings and embodiments.

Figure 1:
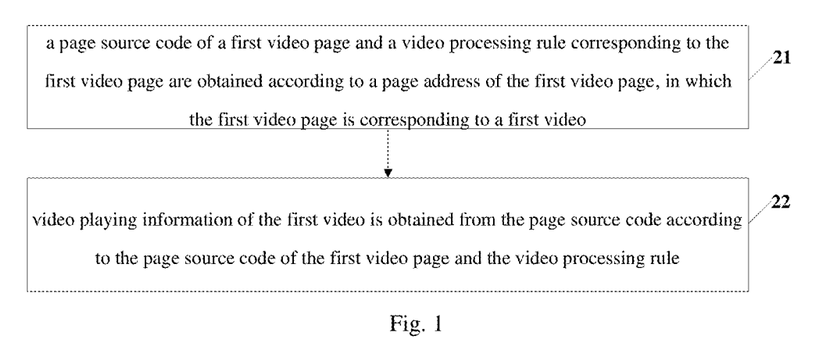
FIG. 1 is a flow chart of a video processing method according to an embodiment of the present disclosure.

Embodiments of the present disclosure provide a video processing method, as shown in FIG. 1, the method includes following steps.

In step 21, a page source code of a first video page and a video processing rule corresponding to the first video page are obtained according to a page address of the first video page, in which the first video page is corresponding to a first video.

In step 22, video playing information of the first video is obtained from the page source code according to the page source code of the first video page and the video processing rule.

It should be noted that the page in embodiments of the present disclosure mainly refers to a webpage, and certainly may also refer to other pages that can be browsed by a user, which is not limited herein.

For example, the video playing information in embodiments of the present disclosure includes, but is not limited to, at least one of a video playing address, a video title and a video thumbnail.

Generally speaking, in page source codes of webpages of most websites (such as video websites), there is one or more code representation manners conventionally used for the "video playing information", i.e., a source code corresponding to the "video playing information" is regular in the page source code. In embodiments of the present disclosure, the code representation manner conventionally used for the video playing information in the webpage of the website is referred as the video processing rule. In other words, most websites have their respective video processing rules, and the webpages of these websites follow the corresponding video processing rules respectively.

Based on this, in embodiments of the present disclosure, a certain number of video processing rules of websites are pre-collected and preset, so as to establish a database or a data list of video processing rules. For a certain video webpage of a particular website, the website corresponding to the webpage may be determined according to an page address of the webpage, and the video processing rule corresponding to the website (i.e., the video webpage) may be found in the preset database or data list of video processing rules, and thus the video playing information corresponding to the video webpage may be found from the page source code of the video webpage.

In embodiments of the present disclosure, when the page is a webpage, the page address of each video page refers to a uniform resource locator (URL) address. It may be determined which website the video page belongs to by analyzing the URL address, and the video processing rule corresponding to the website can be found, i.e., the video processing rule corresponding to the video page can be found.

With the above method, the video playing information of the first video can be obtained, and the video playing information can be displayed to the user without opening the first video page by the user, and thus the user can play the video according to the video playing information. Therefore, the user can play the first video directly without waiting for the opening of the first video page, and it is avoided that the user may be forced to watch other content irrelevant with the video when the user enters the first video page, thus achieving objectives of the present disclosure.

It should be noted that the above method according to embodiments of the present disclosure may be used in a mobile terminal or personal computer (PC) and executed by the mobile terminal or the PC, specifically by a client device or a function module installed in the mobile terminal or the PC. The above method according to embodiments of the present disclosure may also be used in a server side opposite to the mobile terminal or PC and executed by the server, specifically by a server device or a function module installed in the server.

In an embodiment of the present disclosure, the above method is used in the server side, the video processing rule configured to obtain the video playing information of the video in the video page is preset in the server, and the server obtains the page source code and the video processing rule corresponding to the first video page according to the page address of the first video page and obtains the video playing information of the first video from the page source code according to the video processing rule. The server may send the video playing information to the client side, such that the client device may display the video playing information of the first video to the user, and thus the user can play the first video according to the video playing information without opening the first video page.

When the above method is used in the server side, before step 21 is executed, a first operation instruction on the first video page is received from the client device, and the first operation instruction carries the page address of the first video page.

Correspondingly, step 21 includes:

obtaining the page source code of the first video page and the video processing rule corresponding to the first video page according to the page address of the first video page carried by the first operation instruction.

In this case, after step 22 is completed, the video playing information of the first video is returned to the client device, such that the client device displays the video playing information of the first video to the user, and the user can play the first video according to the video playing information without opening the first video page.

Herein, when the user makes a certain operation on the first video page, it may trigger the client device to send the first operation instruction to the server, so as to inform the server that the user has made the certain operation on the first video page. In embodiments of the present disclosure, when the first operation instruction is sent and what the first operation is are not limited. Specifically, the client device may send the first operation instruction when the user makes a certain operation on the first video page. For example, the user makes a search to obtain a search result page, a tag of the first video page is presented in the search result page, and when the user selects the tag of the first video page in the search result page, the client device sends the first operation instruction to the server so as to indicate the server that the user has selected the first video page. For another example, when the user collects the first video page, i.e., the user stores the page address of the first video page, the client device sends the first operation instruction to the server so as to inform the server that the user has collected the first video page. In this case, the server may obtain the page source code of the first video page and the video processing rule corresponding to the first video page according to the page address carried by the first operation instruction, and further obtain the video playing information of the first video from the page source code.

After obtaining the video playing information of the first video, the server may return the video playing information of the first video to the client device directly, such that the client device can display the video playing information to the user. For example, the client device may pop up an information thumbnail window corresponding to the first video page and displays the video playing information in the window. Alternatively, the client device may display the video playing information at a certain position of a current interface directly. Moreover, the user of the client device can play the first video according to the displayed video playing information without opening the first video page.

Therefore, the user can play the first video directly without waiting for the opening of the first video page, and it is avoided that the user may be forced to watch the other content irrelevant with the video when the user enters the first video page, thus achieving the objectives of the present disclosure.

In addition, after obtaining the video playing information of the first video, the server may store the video playing information of the first video first, and then return the video playing information of the first video to the client device when the client device requests the video playing information. That is, before returning the video playing information of the first video to the client device, the method in FIG. 1 further includes receiving a request of obtaining the video playing information from the client device, and returning the video playing information of the first video to the client device includes: returning a response message to the client device according to the request of obtaining the video playing information, in which the response message carries the video playing information of the first video.

After obtaining the video playing information of the first video, the server may first store the video playing information of the first video in the server or other places apart from the server, and then the server may return the video playing information of the first video to the client device if the server receives the request of obtaining the video playing information from the client device.

For example, the client device may send the request of obtaining the video playing information if the user makes a certain operation on the first video page, for example, if the user selects the title corresponding to the first video page. Specifically, a title or a URL of the first video page may be displayed in an interface, and the client device sends the request of obtaining the video playing information to the server if the user selects the title or URL of the first video page in the interface via a mouse.

Certainly, in order to avoid an illegal invasion, the server may only obtain the page source code and the video processing rule corresponding to a video page in a pre-stored video page list (which may be referred as a white list), i.e., only if the page address of the first video page is matched with at least one domain name in the video page list, the server obtains the corresponding page source code and the video processing rule according to the page address. Therefore, the method further includes following steps:

matching the page address of the first video page with domain names in the pre-stored video page list to obtain a matching result; and obtaining the page source code of the first video page and the video processing rule corresponding to the first video page according to the page address of the first video page, if the matching result indicates that the page address is matched with at least one domain name in the video page list.

Specifically, in the method according to any above embodiment, the video processing rule may be represented by a regular expression.

In this case, step 22 specifically includes:

searching for a source code matched with the regular expression from the page source code according to the regular expression representing the video processing rule, so as to obtain the video playing information of the first video.

In embodiments of the present disclosure, the video processing rule may be represented by the regular expression. The regular expression is a single string configured to describe or match with a series of strings satisfying a certain syntactic rule. Required information can be obtained from the page source code according to the regular expression. Examples are shown as follows.

EXAMPLE 1

For a video webpage in a certain website, a code representation of a video playing address in a page source code of the webpage, i.e., a video processing rule, is: var playerUrl='video playing address'.

Thus, the rule may be represented by a regular expression /var\splayerUrl\s=\s\'(.*?)\', through which a specific playing address of the video in the video webpage can be directly obtained from the page source code of the video webpage in the web site.

Certainly, in actual applications, it needs to preset a list of websites in which the video playing information needs to be grabbed, and to configure the regular expression used for obtaining the video playing information according to the page source code of the webpage in the website, so as to extract the video playing information. Preferably, the regular expression is corresponding to a domain name.

Since the page source codes of the video webpages under a same domain name usually have a same rule, i.e., the video playing information in the page source codes usually appears at one or more constant positions or uses one or more constant code representation manners, and thus one or more regular expressions may be selected as the video processing rules corresponding to the domain name. In other words, a database or list of correspondence between websites and regular expressions needs to be pre-established. Preferably, a database or list of correspondence between domain names of the websites in the website list and regular expressions may be established.

In general, each domain name may be corresponding to one or more regular expressions. For example, a certain website may have multiple source code representations of a download address, and thus multiple regular expressions need to be configured. Similarly, one regular expression may be corresponding to multiple domain names.

After the correspondence between domain names in the video webpage address list and regular expressions is established, obtaining the video processing rule corresponding to the page address according to the page address of the first video page includes following steps:

determining the domain name corresponding to the first video page according to the page address of the first video page; and querying the preset correspondence according to the domain name corresponding to the first video page, so as to obtain the regular expression corresponding to the domain name.

The domain name matched with the first video page is obtained according to the page address (such as a URL address) of the first video page. Since the database or list of correspondence between domain names and regular expressions is pre-established, the regular expression corresponding to the domain name can be determined according to the domain name, in which one or more regular expressions may be determined herein.

An example of obtaining the video playing information of the first video from the page source code of the first video page is shown as follows.

EXAMPLE 2

A part of the obtained page source code of the first video page is "var playerUrl='http://player.youku.com/player.php/sid/XNTUwMTA4MzEy/v.swf'".

In addition, the video processing rule corresponding to the first video page is represented by a following regular expression: /var\splayerUrl\s=\s\'(.*?)\'.

According to the regular expression, a video playing address in the video playing information of the first video can be directly determined as:

http://player.youku.com/player.php/sid/XNTUwMTA4MzEy/v.swf.

In addition, in the embodiment of the present disclosure, in step 21, the page source code of the first video page is obtained according to the page address of the first video page, which includes following specific steps:

sending a request of obtaining the page source code to a website server corresponding to the first video page according to the page address of the first video page; and receiving a response message from the website server, in which the response message includes the page source code of the first video page.

Specifically, a curl base of PHP may be used to simulate the request of the user so as to request an html source code of the first video page from the website server corresponding to the first video page.

In the above video processing method, video processing rules corresponding to page addresses are preset in the server first, and then when the first operation instruction from the client is received, the page source code and the video processing rule corresponding to the first video page are obtained according to the page address in the first operation instruction, in which the video processing rule preferably may be the regular expression corresponding to the domain name (such as a registered domain name of the website). The video playing information of the first video is obtained from the page source code according to the regular expression, in which the video playing information includes at least one of the video playing address, the video title and the video thumbnail. When the server obtains the video playing information of the first video, the server may send the video playing information to the client device directly, or the server may first store the video playing information in the server, and then send the video playing information to the client device if the server receives the request of obtaining the video playing information from the client device, such that the client device can display the video playing information of the first video to the user, and the user can play the first video according to the video playing information without opening the first video page.

Figure 2:
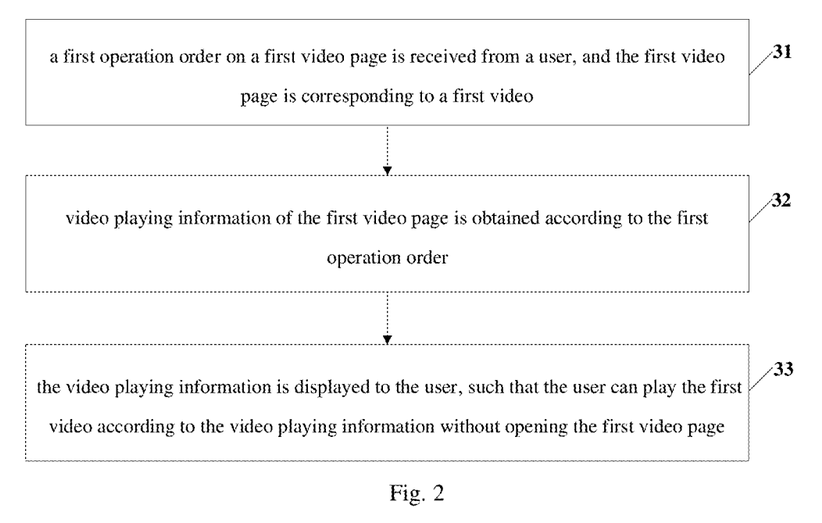
FIG. 2 is a flow chart of another video processing method according to an embodiment of the present disclosure.

Embodiments of the present disclosure further provide a video processing method, executed by the client device, as shown in FIG. 2, and the method includes following steps.

In step 31, a first operation order on a first video page is received from a user, and the first video page is corresponding to a first video.

In step 32, video playing information of the first video page is obtained according to the first operation order.

In step 33, the video playing information is displayed to the user, such that the user can play the first video according to the video playing information without opening the first video page.

The above video processing method is used in the client device, preferably in a web favorites client device.

The first operation order herein may be an operation order from the user for making a certain operation on the first video page, such as a selection operation order of selecting a tag or a title link of the first video page displayed on the screen by the user, and a collection order of collecting the first video page by the user, i.e., storing the page address of the first video page by the user.

It may be understood that, in step 32, the client device may use the method shown in FIG. 1 to obtain the video playing information of the first video, which refers to the previous description and is omitted herein.

Alternatively, step 32 may include following steps:

sending a first operation instruction on the first video page to the server according to the first operation order, in which the first operation instruction carries the page address of the first video page, such that the server can obtain the video playing information of the first video page according to the page address of the first video page; and receiving the video playing information of the first video page returned by the server.

The server may use the method shown in FIG. 1 to obtain the video playing information of the first video page, which is omitted herein.

When the client device receives the first operation order on the first video page from the user, the client device determines a corresponding server according to the page address of the first video page carried by the first operation instruction, and sends the first operation instruction to the server so as to obtain the video playing information of the first video corresponding to the first video page. Furthermore, the client device displays the video playing information to the user, such that the user can play the first video according to the video playing information without opening the first video page.

In embodiments of the present disclosure, after the video playing information corresponding to the video is obtained, the video can be directly played according to the video playing information without entering the video page, which avoids that the user may be forced to watch other content irrelevant with the video when entering the video page, thus achieving the objectives of the present disclosure.

In an embodiment of the present disclosure, before the video playing information of the first video page returned by the server is received, the method further includes following steps:

providing a first interface, in which the first interface includes a page address region and a preview region, a page list is displayed in the page address region, identification information of the first video page is displayed in the page list, and the identification information includes a title and/or the page address of the first video page;

receiving a second operation order on the identification information of the first video page from the user; and sending a request of obtaining the video playing information to the server according to the second operation order.

Receiving the video playing information of the first video page returned by the server includes:

receiving a response message returned by the server according to the request of obtaining the video playing information, in which the response message includes the video playing information of the first video page.

Displaying the video playing information to the user includes:

displaying the video playing information in the preview region.

Figure 3:
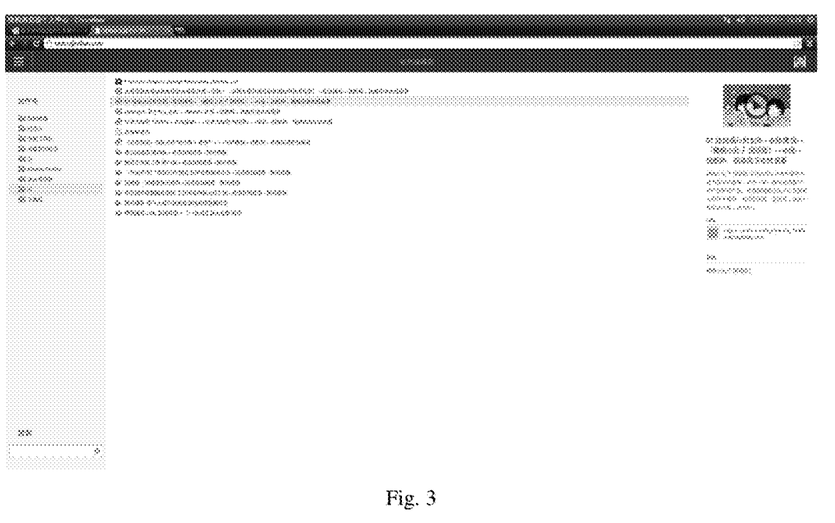
FIG. 3 is a schematic diagram of displaying preview information in a preview bar of a client according to an embodiment of the present disclosure.

In embodiments of the present disclosure, preferably, the client device provides the first interface, and the first interface is displayed on the screen, as shown in FIG. 3, the first interface includes a folder region on a left side thereof, the page address region in the middle and the preview region on a right side thereof. The page list is displayed in the page address region, and the identification information of multiple pages including the first video page is displayed in the page list. The identification information may be the title of the page, certainly also may be the page address, and further may be the title and the page address.

When the second operation order on the identification information of the first video page is received, the client device sends the request of obtaining the video playing information to the server, and the server returns the response message according to the request of obtaining the video playing information, in which the response message includes the video playing information of the first video page. The second operation order is an order of selecting the first video page by the user. As shown in FIG. 3, the user clicks a lateral blank region behind the title of the first video page in the page address region to select the first video page. The client device displays the video playing information in the preview region, in which the video playing information includes the video thumbnail, the video playing address and the video title. The video title is an introduction of the first video, for example, if the first video is a TV play, the video title includes a name of the TV play. The user may know about detailed information of the first video via the information in the preview region.

If it needs to generate a preview in the client device, the video playing information at least includes the video playing address and the video thumbnail.

If the user clicks the video thumbnail or the video playing address in the preview region, it is determined that the user intends to play the video. Thus, the method further includes following steps:

displaying the first video according to the video playing address if it is detected that the user clicks the video thumbnail or the video playing address in the preview region.

When the first video is played, preferably, a playing window is displayed as a floating layer above the first interface and the first video is played via the playing window. That is, the layer containing the first interface remains unchanged, and another layer in which the playing window is displayed is disposed on the first interface.

Figure 4:
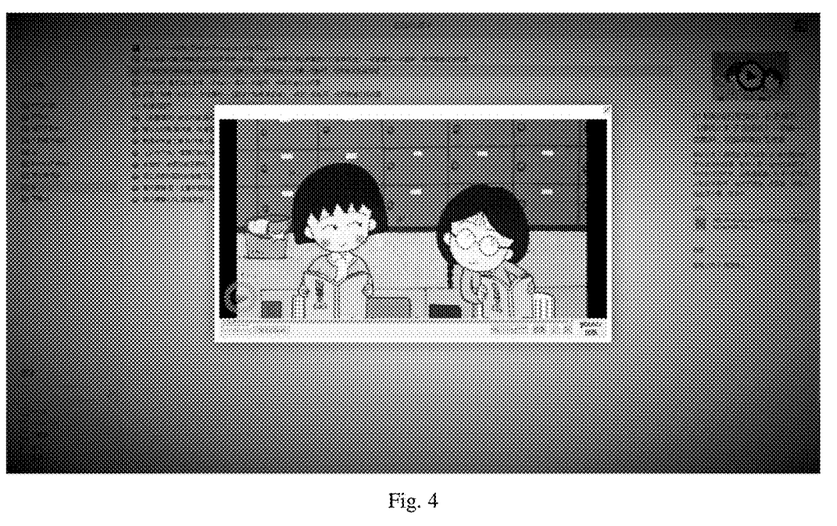
FIG. 4 is a schematic diagram of playing video via a video processing method according to an embodiment of the present disclosure.

Meanwhile, in order to draw attention of the user to the played video, as shown in FIG. 4, a semitransparent shielding layer, certainly or a non-transparent shielding layer, may be disposed around the playing window so as to shield a part of the first interface which is not shielded by the playing window.

It should be noted that, the video processing method according to embodiments of the present disclosure may not only be used in the web favorites, but also be used in client devices such as a local favorites, a related video searching page, a video waterfall flow and a Weibo video displaying, and the video playing information of the video in the video page may be obtained via the predetermined rule corresponding to the page address and capable of obtaining the video playing information of the video in the video webpage, and furthermore the video can be directly played without opening an original playing page of the video.

In the following, an example illustrating the method of the present disclosure is described. In this example, the method is used in the web favorites client device, and the server presets an address list (i.e., the white list) of video pages in which the video playing information needs to be grabbed.

In step 1, the web favorites client device provides a favorites interface (i.e., a first interface). The favorites interface includes a folder region, a page address region and a preview region, as shown in FIG. 3. A plurality of folders which are default or created by the user are displayed in the folder region, and the page addresses collected by the user are stored in the folder. When the user clicks a certain folder, a list of page addresses stored in the folder is displayed in the page address region in a form of title and/or URL address. The web favorites client device receives a first operation order on a first video page from a user, the first video page is corresponding to a first video, and the first operation order herein is a collection order which indicates that the user selects and collects the first video page. When collecting the first video page, the user may store the page address of the first video page in any folder in the folder region, or in a newly created folder. After the user collects the first video page and clicks the folder in which the page address of the first video page is stored, the list of page addresses including the title of the first video page is displayed in the page address region.

In step 2, the web favorites client device sends a first operation instruction on the first video page to the server according to the first operation order, so as to inform the server that the user collects the first video page, in which the first operation instruction carries the page address of the first video page.

In step 3, after receiving the first operation instruction, the server matches the page address carried by the first operation instruction with domain names in a pre-stored list of video pages to obtain a matching result. If the matching result indicates that the page address is matched with at least one domain name in the list of video pages, step 4 is executed.

In step 4, a page source code of the first video page and a video processing rule corresponding to the first video page are obtained according to the page address of the first video page carried by the first operation instruction. The video processing rule is represented by a regular expression and the regular expression is corresponding to the domain name.

Obtaining the video processing rule according to the page address of the first video page includes:

determining the domain name corresponding to the first video page according to the page address of the first video page; and querying a preset video processing rule according to the domain name corresponding to the first video page, so as to obtain the regular expression corresponding to the domain name.

In step 5, a source code matched with the regular expression is found from the page source code according to the regular expression representing the video processing rule, so as to obtain video playing information of the first video.

In step 6, the server stores the video playing information of the first video.

In step 7, the web favorites client device receives a second operation order on the identification information of the first video page from the user. The second operation order herein is an order of selecting the first video page by the user. As shown in FIG. 3, the user clicks a lateral blank region behind the title of the collected first video page.

In step 8, the web favorites client device sends a request of obtaining the video playing information to the server according to the second operation order.

In step 9, the server generates a response message according to the request of obtaining the video playing information and returns the response message to the web favorites client device. The response message includes the video playing information of the first video.

In step 10, after receiving the video playing information in the response message, the web favorites client device generates a preview in the preview region, in which the video playing information at least includes a video playing address and a video thumbnail. As shown in FIG. 3, the preview includes the video thumbnail, the video title and the video playing address.

In step 11, if the web favorites client device detects that the user clicks the video thumbnail or the video playing address in the preview region, the web favorites client device displays a playing window as a floating layer above the favorites interface and plays the first video via the playing window. Meanwhile, a semitransparent shielding layer is disposed around the playing window so as to shield a part of the first interface which is not shielded by the playing window, as shown in FIG. 4.

In above processes, the video processing rule is set and the video playing information of the video in the video page can be obtained directly via the video processing rule. Furthermore, the corresponding video can be played directly according to the video playing information without entering into the video playing page. Meanwhile the content (such as advertisements) irrelevant with the video in the video playing interface can be avoided, thus improving a visual effect and a user experience. When the video is played directly, a floating layer is presented above the original page to play the video, and the content of the original page in the browser is shielded by the semitransparent shielding layer, such that attention of the user can be drawn to the video, thus further improving the user experience.

Figure 5:
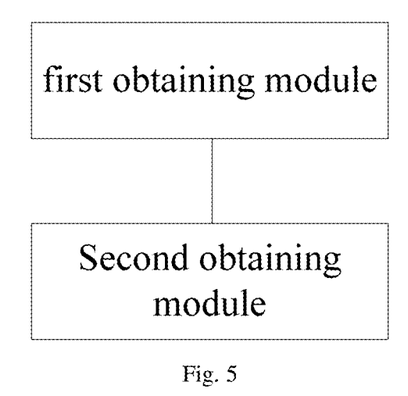
FIG. 5 is a block diagram of a video processing apparatus according to an embodiment of the present disclosure.

Embodiments of the present disclosure further provide a video processing apparatus, as shown in FIG. 5, the apparatus includes:

a first obtaining module, configured to obtain a page source code of a first video page and a video processing rule corresponding to the first video page according to a page address of the first video page, the first video page being corresponding to a first video;

a second obtaining module, configured to obtain video playing information of the first video from the page source code according to the page source code of the first video page and the video processing rule.

The video processing apparatus may further include:

a first receiving module, configured to receive a first operation instruction on the first video page from a client device, the first operation instruction carrying the page address of the first video page.

In this case, the first obtaining module is configured to:

obtain the page source code of the first video page and the video processing rule corresponding to the first video page according to the page address of the first video page carried by the first operation instruction.

The apparatus may further include:

a first sending module, configured to return the video playing information of the first video to the client device, such that the client device can display the video playing information of the first video to a user, and the user can play the first video according to the video playing information without opening the first video page.

The video processing apparatus may further include:

a second receiving module, configured to receive a request of obtaining the video playing information from the client device.

In this case, the first sending module is configured to:

return a response message to the client device according to the request of obtaining the video playing information, the response message carrying the video playing information of the first video.

The video processing apparatus may further include:

a matching module, configured to match the page address with domain names in a pre-stored video page list to obtain a matching result.

In this case, the first obtaining module is configured to obtain the page source code of the first video page and the video processing rule corresponding to the first video page according to the page address of the first video page, if the matching result indicates that the page address is matched with at least one domain name in the video page list.

In an embodiment, the video processing rule is represented by a regular expression, and the second obtaining module is configured to:

search for a source code matched with the regular expression from the page source code according to the regular expression representing the video processing rule, so as to obtain the video playing information of the first video.

In an embodiment, the regular expression is corresponding to the domain name, and the first obtaining module includes:

a determining sub-module, configured to determine a domain name corresponding to the first video page according to the page address of the first video page;

an obtaining sub-module, configured to query a preset video processing rule according to the domain name corresponding to the first video page, so as to obtain the regular expression corresponding to the domain name.

In an embodiment, the video playing information includes at least one of a video playing address, a video title and a video thumbnail.

Figure 6:
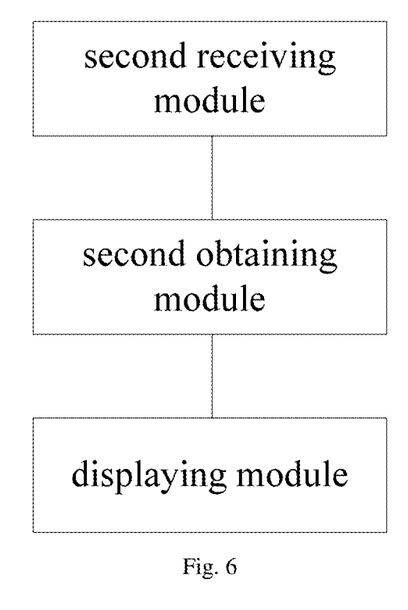
FIG. 6 is a block diagram of another video processing apparatus according to an embodiment of the present disclosure.

Embodiments of the present disclosure further provide a video processing apparatus, as shown in FIG. 6, the apparatus includes:

a third receiving module, configured to receive a first operation order on a first video page from a user, the first video page being corresponding to a first video;

a third obtaining module, configured to obtain video playing information of the first video page according to the first operation order;

a displaying module, configured to display the video playing information to the user, such that the user can play the first video according to the video playing information without opening the first video page.

In an embodiment, the third obtaining module may include:

an operation instruction sending sub-module, configured to send a first operation instruction on the first video page to a server according to the first operation order, the first operation instruction carrying the page address of the first video page, such that the server can obtain a page source code of the first video page and a video processing rule corresponding to the first video page according to the page address, and obtain the video playing information of the first video page from the page source code according to the page source code of the first video page and the video processing rule;

a video playing information receiving sub-module, configured to receive the video playing information of the first video page returned by the server.

In another embodiment, the third obtaining module may include:

a page address determining sub-module, configured to determine a page address of the first video page according to the first operation order;

a rule obtaining sub-module, configured to obtain the page source code of the first video page and the video processing rule corresponding to the first video page according to the page address of the first video page;

an information obtaining sub-module, configured to obtain the video playing information of the first video page from the page source code according to the page source code of the first video page and the video processing rule.

The video processing apparatus may further include:

an interface providing module, configured to provide a first interface, the first interface including a page address region and a preview region, a page list being displayed in the page address region, identification information of the first video page being displayed in the page list, and the identification information including a title and/or the page address of the first video page;

a fourth receiving module, configured to receive a second operation order on the identification information of the first video page from the user;

a second sending module, configured to send a request of obtaining the video playing information to the server according to the second operation order.

In this case, the video playing information receiving sub-module is configured to:

receive a response message returned by the server according to the request of obtaining the video playing information, the response message including the video playing information of the first video page.

In this case, the displaying module is configured to:

display the video playing information in the preview region.

In an embodiment, the video playing information at least includes a video playing address and a video thumbnail, and the apparatus further includes:

a video playing module, configured to play the first video according to the video playing address if it is detected that the user clicks the video thumbnail or the video playing address in the preview region.

In an embodiment, the video playing module is configured to:

display a playing window as a floating layer above the first interface and play the first video via the playing window.

In an embodiment, a non-transparent or semitransparent shielding layer is disposed around the playing window so as to shield a part of the first interface which is not shielded by the playing window.

Embodiments of the present disclosure further provide a server, including a video processing apparatus according to above embodiments of the present disclosure.

Embodiments of the present disclosure further provide a client device, including a video processing apparatus according to above embodiments of the present disclosure.

Embodiments of the present disclosure further provide a readable storage medium having stored therein computer programs that, when executed, are configured to perform a video processing method according above embodiments of the present disclosure.

It should be noted that, for convenience of descriptions, the above apparatus is divided into various modules according to functions thereof, and the various modules are described respectively. Certainly, in embodiments of the present disclosure, the functions of the various modules may be implemented in one or more software and/or hardware.

Through the above description of the embodiments, it should be clearly appreciated by the person skilled in the art that the present application may be implemented by means of software in connection with the required universal hardware platform. Based on this understanding, the essential part or the part contributing to the prior art of the technical solution of the invention may be embodied as a form of software product. The computer software product may be stored in the storage medium, such as ROM/RAM, a magnetic disc and an optical disc, and comprise a plurality of instructions which could be used to execute the method as described in various embodiments of the disclosure by a computer device (which may be a personal computer, a server or a network device).

The present disclosure can be used in many universal or special computing system environments or configurations, such as a personal computer, a hand-held apparatus or a portable apparatus, a flat panel apparatus, a multiprocessor system, a microprocessor-based system, a programmable consumer electronic apparatus, a network PC, a minicomputer and a distributed computing environment including any of the above systems or apparatuses.

The disclosure may be described in the context of a computer-executable instruction executed by a computer, such as a program module. Generally, the program module includes a routine, a program, an object, a component, and a data structure which perform a particular task or implement a particular abstract data type. The disclosure may also be implemented in a distributed computing environment. In such distributed computing environment, the task is performed by a remote processing apparatus connected via a communication network. In the distributed computing environment, the program module may be located in local and remote computer storage media including the storage apparatus.

One or more exemplary embodiments of the present disclosure provide a video processing method, a video processing apparatus and a browser, which can obtain video playing information related to a video in a video playing page according to a predetermined video processing rule, and thus a user can play the video according to the video playing information directly without entering the video playing page.

It should be noted that relationship terms such as first and second are only used herein to distinguish an entity or operation from another entity or operation, and it is not necessarily required or implied that there are any actual relationship or order of this kind between those entities and operations. Moreover, terms such as "comprise", "comprising" and any other variants are intended to cover non-exclusive contains, so that the processes, methods, articles or devices including a series of elements not only include those elements but also include other elements that are not listed definitely, or also include the elements inherent in the processes, methods, articles or devices. In the case of no more restrictions, the elements defined by the statement 'comprise one . . . ' do not exclude that other same elements also exist in the processes, methods, articles or devices including the elements.

It should be noted that each embodiment in the specification is described in a relevant manner. For same or similar parts in the embodiments, reference may be made to each other. What is different from other embodiments is emphasized in each embodiment. In particular, for the apparatus embodiment, because it is basically similar to the method embodiment, the apparatus embodiment is described simply, and for a relevant part thereof, reference may be made to part of the description of the method embodiment.

Those described above are only embodiments of the present invention. It should be noted that, for the skilled in the art, improvements and modifications may also be made without departing from the principle of the invention. Those improvements and modifications should also be included in the scope of protection of the present invention.

What is claimed is:

1. A video processing method executed by software instructions on a hardware processor, comprising:
   receiving a first operation instruction on a first video page from a client device, the first operation instruction carrying a page address of the first video page, the first video page corresponding to a first video;
   after receiving the first operation instruction,
   obtaining a page source code of the first video page according to the page address of the first video page;
   finding a video processing rule in a preset database or a data list of video processing rules according to the page address of the first video page by:
      determining a domain name corresponding to the first video page according to the page address of the first video page;
      finding the video processing rule according to the domain name corresponding to the first video page, wherein the video processing rule is represented by a regular expression that is matched with the domain name in the preset database or the data list and is a code representation manner used for video playing information in the first video page;
   obtaining the video playing information of the first video by searching for source code matched with the regular expression from the page source code according to the regular expression representing the video processing rule, so as to obtain the video playing information from the page source code of the first video page;
   and after obtaining the video playing information of the first video, the method further comprises:
   returning the video playing information of the first video to the client device, such that the client device displays the video playing information of the first video to a user, and the user can play the first video according to the video playing information without opening the first video page.

2. The video processing method executed by software instructions on a hardware processor according to claim 1, wherein before returning the video playing information of the first video to the client device, the method further comprises:
   receiving a request of obtaining the video playing information from the client device;
   wherein returning the video playing information of the first video to the client device comprises:
   returning a response message to the client device according to the request of obtaining the video playing information, the response message carrying the video playing information of the first video.

3. The video processing method executed by software instructions on a hardware processor according to claim 1, wherein:
   determining the domain name comprises matching the page address with domain names in a pre-stored video page list to obtain a matching result;
   performing the acts of obtaining the page source code of the first video page and finding the video processing rule corresponding to the first video page according to the page address of the first video page, if the matching result indicates that the page address is matched with at least one domain name in the video page list.

4. The video processing method executed by software instructions on a hardware processor according to claim 1, wherein the regular expression is corresponding to the domain name; and
   wherein finding the video processing rule according to the domain name corresponding to the first video page comprises:
   querying a preset correspondence relationship between domain names and regular expressions according to the domain name corresponding to the first video page, so as to obtain the regular expression corresponding to the domain name.

5. The video processing method executed by software instructions on a hardware processor according to claim 1, wherein the video playing information comprises at least one of a video playing address, a video title and a video thumbnail.

6. A server, comprising:
   a processor;
   a memory configured to store instructions executable by the processor;
   wherein the processor is configured to:
   receive a first operation instruction on a first video page from a client device, the first operation instruction carrying a page address of the first video page, the first video page corresponding to a first video;
   after receiving the first operation instruction,
   obtain a page source code of the first video page according to the page address of the first video page;
   find a video processing rule in a preset database or a data list of video processing rules according to the page address of the first video page by:
      determining a domain name corresponding to the first video page according to the page address of the first video page;
      finding the video processing rule according to the domain name corresponding to the first video page, wherein the video processing rule is represented by a regular expression that is matched with the domain name in the preset database or the data list and is a code representation manner used for video playing information in the first video page;
   obtain the video playing information of the first video by searching for source code matched with the regular expression from the page source code according to the regular expression representing the video processing rule, so as to obtain the video playing information from the page source code of the first video page;

and after obtaining the video playing information of the first video, return the video playing information of the first video to the client device, such that the client device displays the video playing information of the first video to a user, and the user can play the first video according to the video playing information without opening the first video page.

7. The server according to claim 6, wherein the processor is further configured to:

receive a request of obtaining the video playing information from the client device;

return a response message to the client device according to the request of obtaining the video playing information, the response message carrying the video playing information of the first video.

8. The server according to claim 6, wherein the processor is further configured to:

determine the domain name by matching the page address with domain names in a pre-stored video page list to obtain a matching result;

perform the acts of obtaining the page source code of the first video page and finding the video processing rule corresponding to the first video page according to the page address of the first video page, if the matching result indicates that the page address is matched with at least one domain name in the video page list.

9. The server according to claim 6, wherein the regular expression is corresponding to the domain name, and the processor is configured to:

query a preset correspondence relationship between domain names and regular expressions according to the domain name corresponding to the first video page, so as to obtain the regular expression corresponding to the domain name.

10. The server according to claim 6, wherein the video playing information comprises at least one of a video playing address, a video title and a video thumbnail.

* * * * *

UNITED STATES PATENT AND TRADEMARK OFFICE
CERTIFICATE OF CORRECTION

| | |
|---|---|
| PATENT NO. | : 10,110,966 B2 |
| APPLICATION NO. | : 14/904606 |
| DATED | : October 23, 2018 |
| INVENTOR(S) | : Kaihong Zhang, Zhen Wan and Sheng Fu |

It is certified that error appears in the above-identified patent and that said Letters Patent is hereby corrected as shown below:

On the Title Page

Item (73) Assignee, delete, "BEIJING KINGSOFT INTERNET NETWORK TECHNOLOGY CO., LTD." and insert therefor --BEIJING KINGSOFT NETWORK TECHNOLOGY CO., LTD.--

Signed and Sealed this
Twenty-fifth Day of October, 2022

Katherine Kelly Vidal
*Director of the United States Patent and Trademark Office*